No. 615,919. Patented Dec. 13, 1898.
R. R. SPEARS.
MACHINE FOR TURNING CARRIAGE AXLES.
(Application filed Mar. 31, 1898.)
(No Model.) 5 Sheets—Sheet 1.

Witnesses
Inventor
Ralph R. Spears,
By his Attorneys,

No. 615,919. Patented Dec. 13, 1898.
R. R. SPEARS.
MACHINE FOR TURNING CARRIAGE AXLES.
(Application filed Mar. 31, 1898.)
(No Model.) 5 Sheets—Sheet 3.

R. R. SPEARS.
MACHINE FOR TURNING CARRIAGE AXLES.
(Application filed Mar. 31, 1898.)

Patented Dec. 13, 1898.

(No Model.)

Witnesses

Ralph R. Spears, Inventor

By his Attorneys,

UNITED STATES PATENT OFFICE.

RALPH REED SPEARS, OF WHEELING, WEST VIRGINIA.

MACHINE FOR TURNING CARRIAGE-AXLES.

SPECIFICATION forming part of Letters Patent No. 615,919, dated December 13, 1898.

Application filed March 31, 1898. Serial No. 676,977. (No model.)

*To all whom it may concern:*

Be it known that I, RALPH REED SPEARS, a citizen of the United States, residing at Wheeling, in the county of Ohio and State of West Virginia, have invented a new and useful Machine for Turning Carriage-Axles, of which the following is a specification.

This invention relates to machines for turning carriage-axles, and has for its object to provide an improved machine of this character having means for operating simultaneously upon three axles with different tools, whereby the spindles thereof may be completely turned and nicked or grooved with but one handling.

In the turning or trimming of the spindles of carriage-axles three operations are usually necessary to complete the same, such operations being, first, to remove the rough metal from the axle-spindle; second, to smooth or finish the spindle, and, finally, to groove and round up the collar and tip end of the spindle; and in the present machine these three operations are carried on at one time upon three different axles, so that after one operation of the machine one carriage-axle has been completely turned or trimmed and is ready to be replaced by a rough forged axle.

A further object of the invention is to provide improved means for holding and adjusting the work and for arranging and feeding the tools.

With these and other objects in view, which will readily appear as the nature of the invention is better understood, the same consists in the novel construction, combination, and arrangement of parts hereinafter more fully described, illustrated, and claimed.

Referring to the accompanying drawings, the numeral 1 designates a horizontal machine-bed supported at its ends on the usual supporting-legs 2 and provided at its upper side edges with the oppositely-located parallel longitudinal slideways 3, of a V shape in cross-section and providing for the sliding support of the tool-carriage, to be hereinafter referred to.

The machine-bed 1 has fitted on top thereof, at one end, an open stationary bearing-frame 4, having at its ends the oppositely-located vertically-disposed bearing-rings 5. The bearing-rings 5 of the frame 4 are formed in two sections rabbeted together at their meeting ends, as at 6, and the upper of which sections 7 is removable and detachably connected at its ends with the lower section, matching the same, by means of suitable fastening screws or bolts 8. The upper removable sections 7 of the bearing-rings 5 constitute bearing-yokes, which permit of the ready and convenient removal and replacing of the hollow rotatable work-holding drum 9, arranged within the open bearing-frame 4 and loosely fitting in the rings 5, so as to freely rotate therein. To prevent longitudinal movement or displacement of the rotatable drum 9, the latter is preferably provided near one end thereof with an annular retaining-groove 10, receiving therein one of the bearing-rings 5 of the frame 4.

Figures 2, 12, 13, 15:
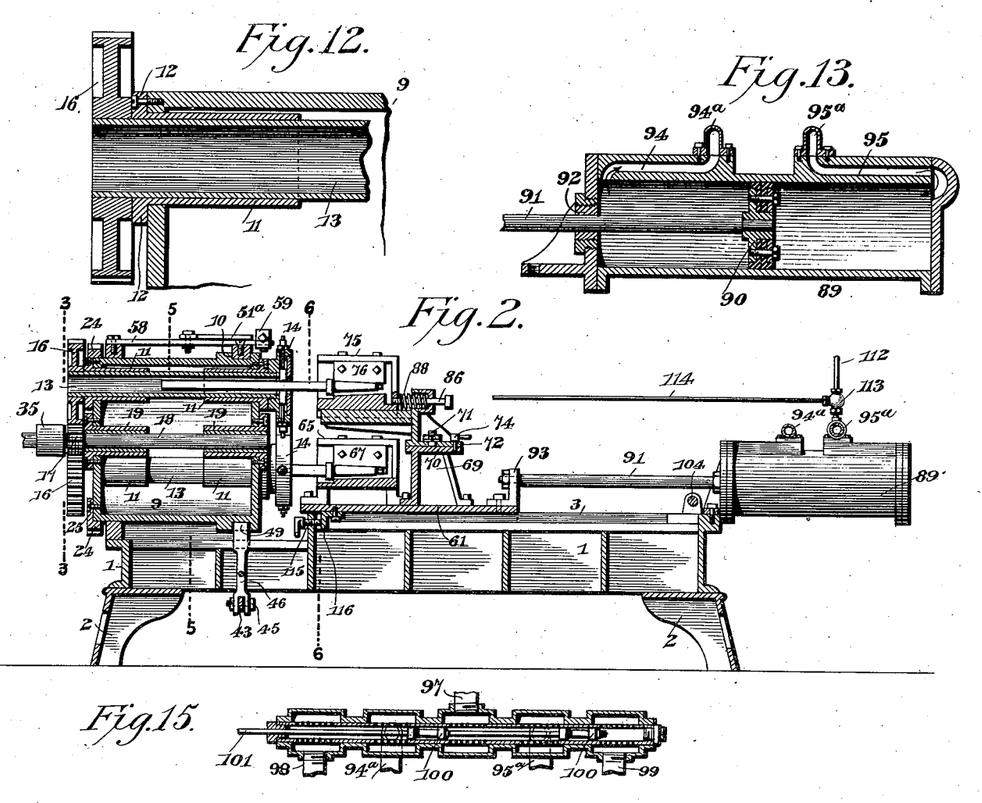
Fig. 2 is a vertical longitudinal sectional view thereof.
Fig. 12 is an enlarged detail sectional view showing one of the bushing-bearings for each tubular chuck-mandrel.
Fig. 13 is a longitudinal sectional view of the hydraulic cylinder of the feed mechanism.
Fig. 15 is a detail longitudinal sectional view of the hydraulic valve mechanism.
Figure 3:
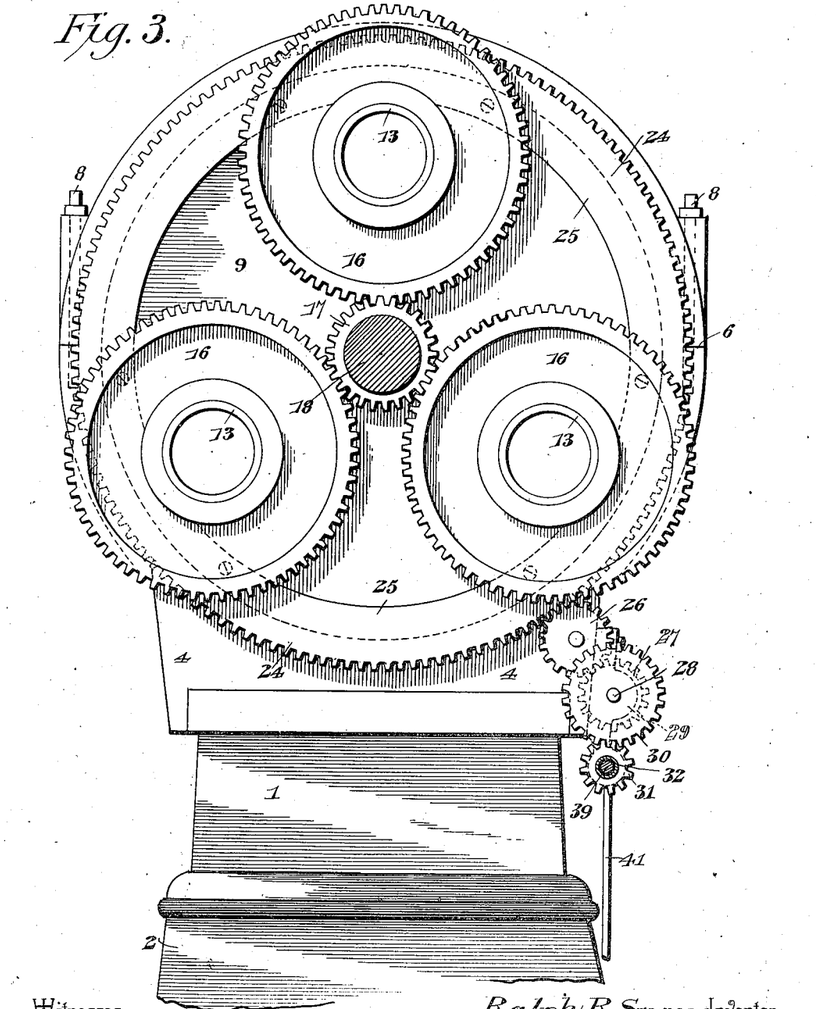
Fig. 3 is an end sectional view on the line 3 3 of Fig. 2.
Figure 4:
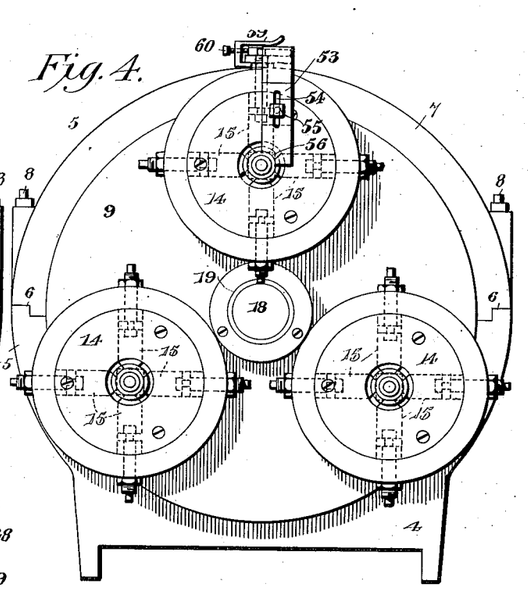
Fig. 4 is an end view of the rotatable work-holding drum, showing the proper relative positions of the work-chucks.
Figure 5:
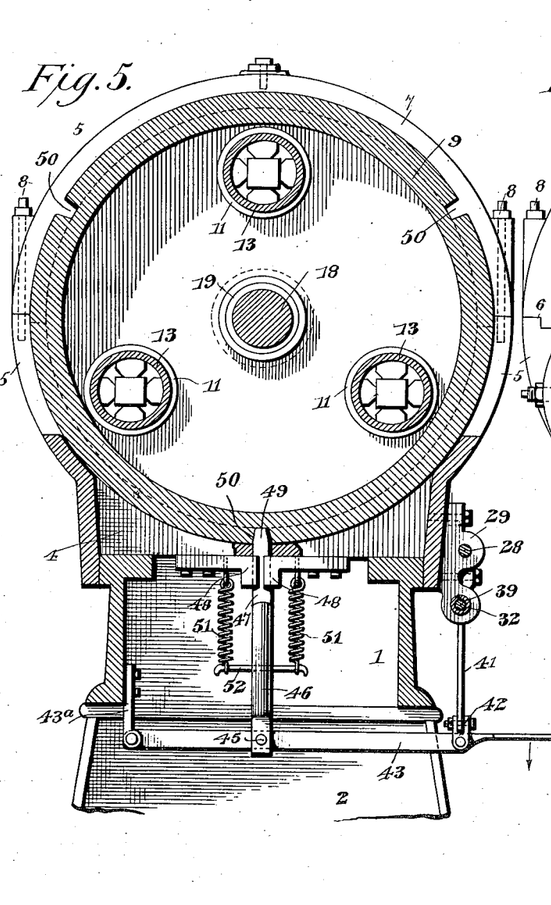
Fig. 5 is a transverse sectional view on the line 5 5 of Fig. 2.

The rotatable work-holding drum 9 has fitted in the opposite ends thereof a concentric series of bearing-bushings 11, which project inwardly within the drum and are provided at their outer ends with end flanges or heads 12, bolted or otherwise suitably secured to the ends of the drum, on the exterior thereof, and the horizontally-alined bushings 11 in the opposite ends of the drum form bearings for the longitudinal rotatable tubular chuck-mandrels 13. The chuck-mandrels 13 are arranged at equal distances apart and concentric with the axis of rotation of the drum and are designed to have a rotation independent of the rotation of the latter when the drum is stationary, as will be hereinafter more fully explained. The said tubular chuck-mandrels 13 extend longitudinally through the rotatable drum and project through the oppositely-located bearing-bushings beyond both ends of the drum, as clearly illustrated in Fig. 2 of the drawings. Each chuck-mandrel has fitted on the inner projecting end thereof a work-holding chuck 14 of any approved construction and fastened in any suitable manner to the mandrel, so as to rotate therewith, each chuck having the usual chuck-jaws 15, adapted to be clamped onto the carriage-axle A to be operated upon, it being understood that the carriage-axles are inserted into the tubular chuck-mandrels and held in position by the chucks 14, carried thereby. The rotation of the mandrels and the chucks carried thereby will therefore provide for rotating the axles against the cutting-tools. There is a pair of oppositely-located bearing-bushings 11 for each of the tubular chuck-mandrels; but there are only three of these mandrels, corresponding to the number of tools required to properly trim and finish the spindles of carriage-axles.

To provide for imparting a simultaneous rotation to the three tubular chuck-mandrels 13, the latter have fitted on their outer projecting ends the mandrel gear-wheels 16, of a uniform diameter and meshing with a common concentrically-arranged drive-pinion 17, fitted on the central drive-shaft 18, arranged longitudinally of the rotatable drum 9 and forming the axis of rotation therefor. The central longitudinal drive-shaft 18 is journaled in the oppositely-located flanged bearing-bushings 19, fitted centrally to the opposite ends of the drum 9 and projected inwardly within the drum in the same manner as the bushings 11 to afford a long bearing for the shaft 18, as well as for the drum when the latter is rotated to shift the position of the axles from one tool to the other.

The extreme outer end of the central drive-shaft 18 is supported in an exterior bearing 20 and has mounted thereon a suitable friction clutch-pulley 21, which receives the driving-belt for communicating motion to the drum and the rotatable chuck-mandrels carried thereby. The friction clutch-pulley 21 is designed to be clutched to the shaft 18 by means of a suitable friction-clutch 22, controlled in the usual manner by the clutch-lever 23, which when manipulated provides for throwing the clutch in and out of action, whereby the pulley 21 may be caused to rotate loosely on the drive-shaft or to be clutched thereto, it being understood that when the friction-clutch is engaged with the pulley 21 the drive-shaft 18 will be rotated and through the medium of the gears 17 and 16 communicate motion to the rotatable chuck-mandrels.

To provide for communicating rotary motion to the rotatable work-holding drum 9, the latter has fastened to one end thereof a gear-ring 24, preferably flanged, as at 25, to receive bolts or similar fastenings for securing the same rigidly to the drum, and the said gear-ring 24 meshes with an adjacent idler-pinion 26, supported at one end of the bearing-frame 4 and in turn meshing with a pinion 27 on the short counter-shaft 28, journaled in the bearing-hangers 29, bolted or otherwise suitably secured to the bearing-frame 4 at one side of the machine-bed. The counter-shaft 28 has fitted thereon at one side of the pinion 27 a gear-wheel 30, meshing with a pinion 31 on the tubular clutch-shaft 32, arranged in a horizontal position at one side of the machine-bed and also journaled in the bearing-hangers 29 below the counter-shaft 28 and parallel therewith. The tubular clutch-shaft 32 has loosely mounted thereon at one side of the pinion 31 a friction clutch-pulley 33, which receives a short drive-belt 34, passing over a belt-pulley 35, mounted on the drive-shaft 18 at one side of the friction clutch-pulley 21 to provide means for communicating motion to the tubular clutch-shaft 32 and thence through the medium of the gearing described to the rotatable drum 9. The friction clutch-pulley 33 is provided at one side with the clutch-ring 36, adapted to be engaged and disengaged by the friction-clutch 37, feathered on one end of the shaft 32 at one side of the pulley 33 and having a loose connection 38 with one end of the clutch-operating rod 39, extending longitudinally through the shaft 32 and having its end opposite the end connected with the friction-clutch pivotally connected with the cam 39ᵃ at one end of a short cam-link 40. The other end of this cam-link 40 is pivotally connected to the upper end of an operating arm or rod 41, whose lower end is pivotally connected at 42 to a treadle 43.

The treadle 43 is arranged transversely beneath the machine-bed and is pivotally supported at its inner end to a hanger-strap 43ᵃ or other suitable fixed point of attachment, and at a point intermediate its ends the said treadle 43 has pivotally attached thereto, as at 45, the lower end of a vertically-movable locking-bolt 46. The locking-bolt 46 is provided with an upper squared end portion 47, arranged to slide between a pair of flanged or angled guide-plates 48, bolted or otherwise suitably secured to the bearing-frames 4, at the inner side thereof, and the extreme upper end of said bolt 46 is tapered, as at 49, to engage in the peripheral lock-notches 50, formed in the outer surface of the rotatable work-holding drum 9. The vertically-movable bolt 46 is normally held in locking engagement with one of the notches 50 by means of a pair of retractile springs 51, secured at their upper ends to the under side of the bearing-frame and at their lower ends to the extremities of a cross-arm 52, fitted in the locking-bolt 46, and the said lock-notches 50 are spaced at equal distances apart corresponding to the distance between the several chuck-mandrels to provide means for locking the rotatable drum in its three working positions, as will be readily understood by those skilled in the art.

When the locking-bolt 46 is held normally in engagement with one of the notches 50 under the tension of the springs 51, the treadle 43 will be held in its elevated position and thereby relieve the pressure of the cam 39$^a$ from one end of the clutch-shaft 32, which loosens up the operating-rod 39 and the friction-clutch 37, so that the friction clutch-pulley 33 will rotate loosely on the shaft 32. When it is desired to rotate the drum 9 to a new position, a downward pressure on the treadle 43 simultaneously releases the locking-bolt from the drum and tightens the clutch 37 against the pulley 33, which causes a rotation of the shaft 32 and a consequent rotation of the drum 9 to the position desired, it being noted that with the pressure relieved from the treadle 43 the springs 51 will automatically move the locking-bolt into the next succeeding notch 50 and relieve the friction-clutch 37 from the friction clutch-pulley, thereby stopping the rotation of the drum.

The chuck-mandrel which is uppermost in the rotatable work-holding drum always receives the rough forged axle to be turned, and in order to provide for the proper positioning of this axle there is employed a gage-carrying arm 51$^a$, having a vertically-disposed supporting member 52$^a$ at one end, on the outer face of which member is adjustably supported the gage-plate 53. The gage-plate 53 is provided with a longitudinally-disposed slot 54, receiving an adjusting bolt or screw 55, engaging an opening in the supporting member 52$^a$ of the arm 51$^a$ and providing means for the proper vertical adjustment of the said plate 53, which plate is further provided at its lower end and at one side edge thereof with an axle-receiving notch 56, in which the unturned axle-spindle is fitted to adjust the same to the proper position to be operated upon by the tools. After the rough axle has been inserted in the uppermost chuck-mandrel and adjusted against the gage-plate 53 the chuck-jaws of the chuck carried by such mandrel are tightened against said rough axle to secure the same fast with the mandrel. After the adjustment of the rough axle in this manner the notch 56, being in one side edge of the plate 53, permits the gage-carrying arm 51$^a$ to be swung laterally out of the way, and to secure this result the said arm 51$^a$ is pivotally bolted at one end, as at 57, to the upper side of an attaching-bar 58. The attaching-bar 58 is arranged longitudinally above the drum 9 and is secured at its ends on top of the oppositely-located bearing-rings 5, or at least on the upper removable section 7 thereof, and said bar 58 is provided at one end with a horizontally-arranged U-shaped keeper 59, having an adjustable stop-screw 60 fitted in the closed side thereof to form an adjustable stop for the arm 51 to be moved against. The open side of the keeper 59 permits the arm 51$^a$ to be swung to the operative and inoperative positions illustrated in Fig. 11 of the drawings.

The V-shaped longitudinal slideways 3 of the machine-bed beyond the chuck end of the work-holding drum 9 form a slide-bed for the reciprocatory tool-carriage 61, having a slidable base-plate 62, provided at its under side with the parallel longitudinal V-shaped slide-grooves 63, receiving therein the V-shaped slideways 3 of the machine-bed, thereby forming a slide connection between the tool-carriage and the machine-bed, which permits of the free reciprocation of the tool-carriage, while at the same time preventing lateral movement thereof. To prevent upward displacement or movement of the tool-carriage while in operation, there are employed inwardly-projecting retaining-plates 64, secured to the under side of the base-plate 62, at the longitudinal side edges thereof, and slidably engaging beneath the outer side edges of the V-shaped slideways 3 of the machine-bed, as clearly illustrated in Fig. 6 of the drawings.

The slidable base-plate 62 of the tool-carriage has secured thereon, at one edge thereof, a pair of lower tool-holders 65 and 66, respectively, said tool-holders being arranged in the same transverse plane and disposed longitudinally of the tool-carriage, so as to properly receive therein the axle-spindles to be turned. The tool-holders 65 and 66 are substantially duplicates in construction and essentially comprise cylindrical boxings cut away at one side and having fitted therein in different planes the usual axle-steadying plates 67 and the trimming-tools 68, which tools are of any approved pattern and necessarily have their cutting edges conform to the shape of the axle-spindles to be trimmed. At this point it will be understood that the two lower tool-holders 65 and 66, respectively, hold the tools for roughing and finishing the axle-spindles, the roughing-tool in the holder 65 providing for trimming off the rough metal from the rough unfinished axle-spindles, and the finishing-tool in the holder 66 providing for the next succeeding operation—to wit, for completely finishing or trimming off the axle-spindle and its collar and finishing the trimming operation proper, excepting to groove and round up the axle-collar and the tip end of the spindle, and to provide for this latter operation a third tool-holder, which will now be referred to, is employed.

Figure 6:
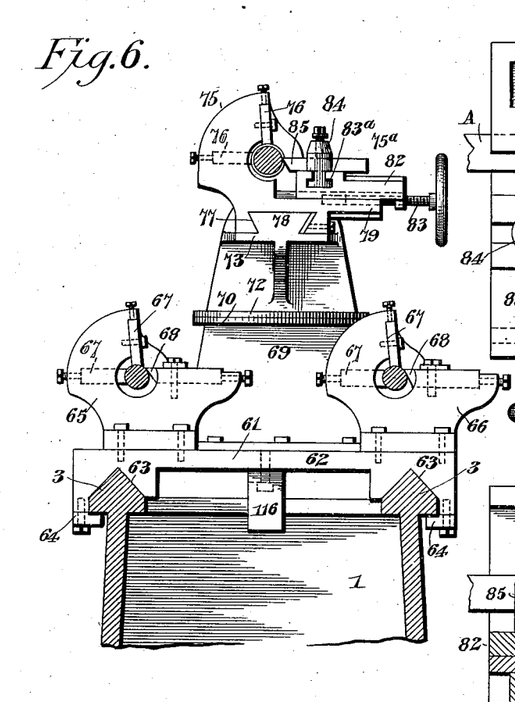
Fig. 6 is an elevation of the reciprocatory tool-carriage on the line of section 6 6 of Fig. 2.

Immediately beyond one end of the lower pair of tool-holders 65 and 66 the base-plate 62 of the tool-carriage has projected from its upper side a pedestal 69, having at its upper side a horizontal bearing-plate 70, on which is pivotally bolted, by means of the pivot-bolt 71, the pivot-plate 72, formed at the lower side, and one end of a horizontal laterally-swinging tool-holder bracket 73, which bracket is projected from its pivotal support horizontally in a plane above and between the lower tool-holders 65 and 66, as plainly illustrated in Fig. 6 of the drawings. A locking-pin 74 is removably fitted in alined openings in the plates 70 and 72 to provide means for holding the bracket-arm 73 in a proper operative position; but by removing the said locking-pin the tool-holder bracket may be readily swung in a lateral direction to afford ready access to the tool-holder carried thereby when adjusting the different parts therein.

Figure 7:
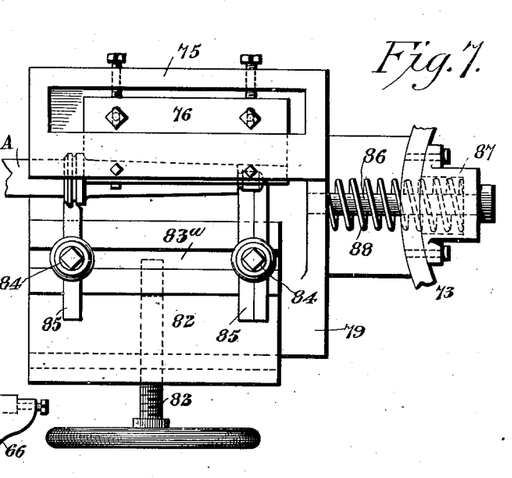
Fig. 7 is a top plan view of the upper tool-holder for the nicking or grooving tools.

The horizontal tool-holder bracket 73 slidably supports thereon an upper tool-holder 75, essentially comprising a cylindrical boxing 75ª, cut away at one side in the same manner as the tool-holder boxings 65 and 66 and having fitted therein in different planes the usual axle-steadying plates 76; but in the present invention an important feature in connection with the said upper tool-holder 75 is the sliding movement relatively to the tool-carriage and the bracket-arm 73. To provide for the support of said tool-holder, the tool-holder boxing is provided at its lower side with a longitudinal dovetail groove 77, slidably embracing the dovetailed guide-rib 78, formed longitudinally of the bracket 73, at the upper side of the latter. The said tool-holder boxing 75ª is further provided at one side with a horizontal laterally-extended supporting-base 79, formed on its upper side with a dovetailed web 80, loosely registering in a correspondingly-shaped recess 81, formed in the under side of the laterally-adjustable sliding tool-supporting plate 82, having an adjusting-screw connection 83 therewith, which provides means for readily adjusting the said plate 82 toward and away from the longitudinal center of the upper-tool-holder boxing. The said laterally-adjustable sliding tool-supporting plate 82 is provided in its upper side with a longitudinal T-groove 83ª, in which are adjustably fitted the tool-posts 84, which tool-posts have adjustably secured therein suitable grooving or nicking tools 85 for operating upon the collar and tip ends of the axle-spindles in order to round up these parts and form the usual grooves or nicks therein. One of said tool-posts 84 carries a pair of the tools 85 for operating upon the reduced tip extremity of the axle-spindles, so that in one operation such tip extremity can be rounded up and formed with the usual annular groove, as clearly illustrated in Fig. 7 of the drawings.

Figures 1, 9, 10, 11:
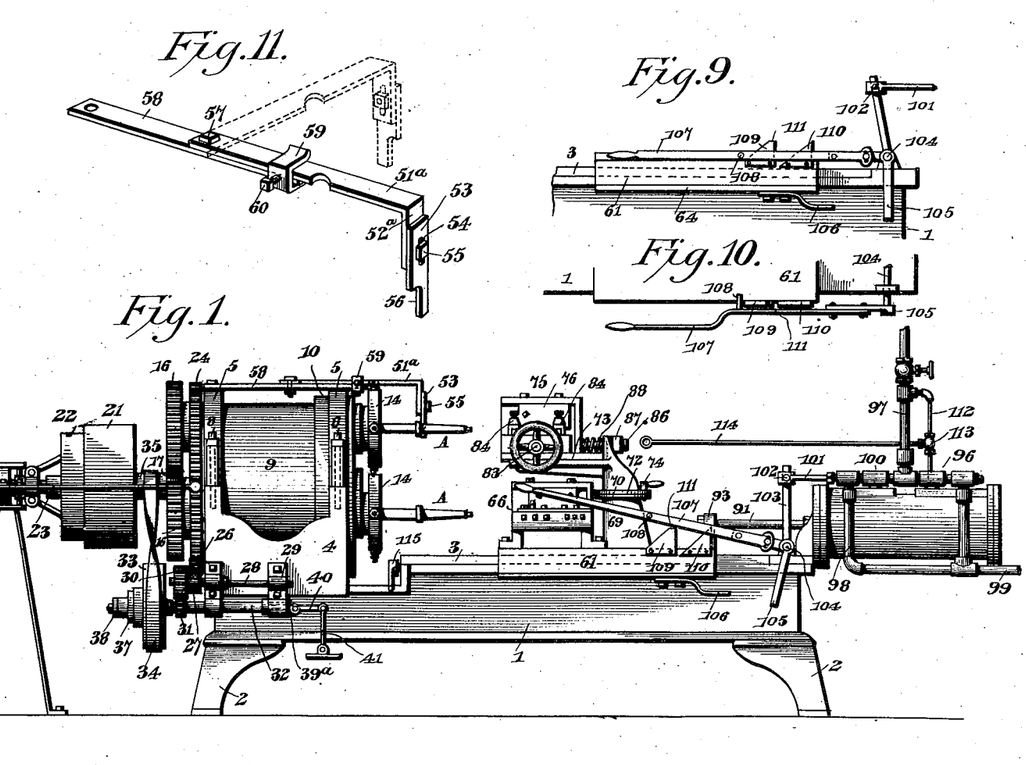
Figure 1 is a side elevation of an axle-turning machine constructed in accordance with this invention.
Fig. 9 is a detail elevation showing the initial position of the feed-controlling lever of the hydraulic feed mechanism for the tool-carrier.
Fig. 10 is a top plan view of the construction shown in Fig. 9.
Fig. 11 is a detail in perspective of the axle-gage for positioning the rough forged axle.
Figure 8:
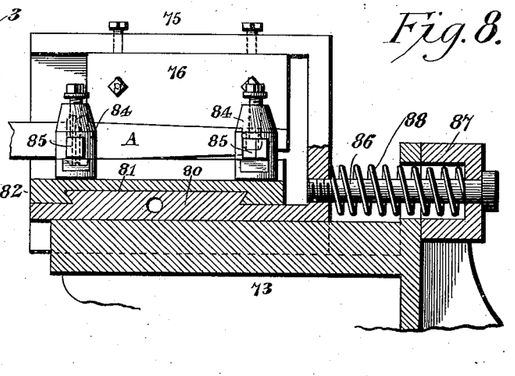
Fig. 8 is a vertical longitudinal sectional view of the construction shown in Fig. 7.
Figure 14:
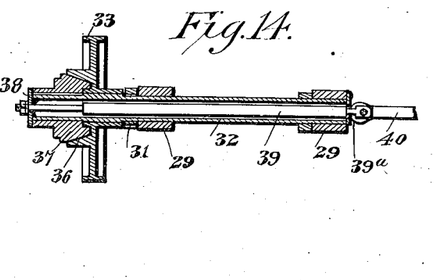
Fig. 14 is a longitudinal detail sectional view of the friction-gear device for the rotatable or revoluble work-holding drum.

The slidable tool-holder 75 has secured to one end of its boxing a guide rod or bolt 86, sliding through the socketed guide-head 87 at one end of the bracket-arm 73, the socket of said guide-head 87 receiving therein one end of an adjusting-spring 88, coiled on the rod 86 and exerting a pressure against one end of the upper tool-holder boxing to provide for normally projecting the other open end of the boxing to a point about two inches in advance of the open axle-receiving ends of the lower tool-holders for the roughing and finishing tools, as clearly illustrated in Figs. 1 and 8 of the drawings. By reason of normally projecting the upper tool-holder to a position in advance of the lower tool-holders it will be understood that when the tool-carriage is advanced onto the axle-spindles the tools carried by the upper tool-holder will first reach the point of cut and will commence to operate upon one axle-spindle before the tools carried by the lower holders commence to cut the other two axle-spindles. When the upper tool-holder reaches the limit of its movement and the tools carried thereby are fed against the work by the adjusting or feed screw connection 83, such tool-holder remains stationary, while the tool-carriage, together with the lower tool-holders 65 and 66, continue the advance movement, so that the tools carried by the lower tool-holders will operate upon and trim up the axle-spindles of the two lower axles, during which operation the spring 88 compresses, so as not to interfere with the advance movement of the lower tool-holders, while the upper tool-holder is stationary. The reverse action is practically the same—that is, the two lower tool-holders 65 and 66 must back off from the work until the compression of the spring 88 is entirely relieved, at which time the upper tool-holder 75 will leave its work and recede therefrom, together with the tool-carriage. This action of the tool-carriage enables the tools of the upper holder to operate a sufficient length of time to entirely complete the axle-spindle, so that the uppermost carriage-axle after each return of the tool-carriage is ready to be removed and replaced in the manner already described.

The advance and return movements of the tool-carriage are controlled through the medium of hydraulic feed-mechanism involving an operation analogous to the operation of the hydraulic feed mechanism disclosed in my former patent, No. 585,715. In the present invention the hydraulic-pressure cylinder 89 is arranged in a horizontal position at one end of the machine-bed and is rigidly bolted or otherwise fastened to said bed, so as to be supported in a proper working position. The cylinder 89 receives therein a reciprocating piston 90, fastened to the inner end of the piston-rod 91, sliding through a stuffing-box 92 at one end of the cylinder and connected at its outer end with a bracket-plate 93, fastened to one end of the tool-carriage base-plate 62, thereby providing a connection between the tool-carriage and piston, so that these parts will move in unison and in a direction according to the direction in which pressure is exerted against the piston or piston-head 90. The hydraulic-pressure cylinder 89 has separate water-passages 94 and 95, communicating, respectively, with opposite ends thereof and having separate connections 94ª and 95ª with a valve-casing 96, arranged horizontally at one side of the cylinder, and having a water-supply-pipe connection 97 therewith at a point between the connections 94ª and 95ª. The opposite ends of the valve-casing 96 have branch discharge-pipe connections 98, communicating with a common discharge-pipe 99. An ordinary double-plunger valve 100 is arranged to reciprocate within the valve-casing 96 and alternately cover and uncover the connections 94ª and 95ª with the opposite ends of the cylinder, and said valve has its stem 101 extended through one end of the valve-casing and loosely connected, as at 102, with the upper end of a rock-arm 103, fastened at its lower end to a short rock-shaft 104, journaled on top of the machine-bed adjacent to the stuffing-box end of the cylinder. The rock-shaft 104 has fitted to its outer end a depending strike-arm 105, adapted to be engaged by a tappet projection 106, fastened to the reciprocatory tool-carriage, at one side thereof. The outer end of the rock-shaft 104 also has connected therewith a feed-controlling lever 107, arranged for movement at one side of the tool-carriage and provided at a point intermediate its ends with an inwardly-projecting pin 108, adapted to ride on the inclined surfaces or edges of the approximately triangular cam-plates 109 and 110, arranged one in advance of the other and fastened to one side edge of the tool-carriage, so as to project above the plane of the base-plate 62 thereof. One of said triangular cam-plates 109 is truncated, so as to be provided with a flat corner 111 at its upper end, and is therefore shorter in height than the other cam-plate 110, both of said cam-plates providing for an automatic controlling of the feed in a manner which will now be referred to. When ready to start the tool-carriage on its advance movement toward the work, the controlling-lever 107 is forced downward to a position which brings its pin 108 at the bottom of the inclined edge of the front cam-plate 109, which movement of the lever draws the valve 100 in a direction to uncover the connection 95ª for the cylinder, so as to allow the full head of water from the pipe 97 to pass into the outer end of the cylinder. The pressure of water against the outer side of the piston 90 will move the same inwardly and will cause the tool-carriage to be rapidly moved toward the carriage-axles carried by the rotating chucks. During the rapid initial movement of the tool-carriage the pin 108 ascends the inclined edge of the front cam-plate 109 and gradually moves the valve 100 toward the cylinder connection 95ª, so that the rapid movement of the carriage will be checked at the moment the carriage-axle spindles are about to enter the tool-holder boxings. At this point the pin 108 will have reached the flat upper end 111 of the cam-plate 109, so that the axles can properly enter the tool-holder boxings, after which the lever 107 is again forced down to bring the pin 108 at the bottom of the inclined edge of the plate 110. This movement of the controlling-lever again allows the full pressure of water to operate against the piston, so that the tool-carriage will take another rapid movement up to the point where the tools begin to cut, and by this time the pin 108 will have ascended the triangular cam-plate 110 and cut off the supply of fluid through the cylinder connection 95ª. To complete the feed of the tool-carriage while the tools are cutting, a by-pass connection 112 is brought into play. The by-pass connection or pipe 112 is a materially smaller gage than the pipe 97 and connects at one end to the latter pipe and at its other end with the cylinder connection 95ª. At a point between its ends the by-pass feed-pipe 112 is provided with a cut-off valve 113, having a handle-rod connection 114 with its stem, so that the passage of water through the pipe 112 may be readily controlled. By opening the valve 113 a reduced flow of water is permitted to pass through the cylinder connection 95ª into the outer end of the cylinder, thereby providing means for slowly completing the feed of the tool-carriage while the tools are cutting. The return movement of the tool-carriage is provided for by forcing the controlling-lever 107 upward, so as to uncover the cylinder connection 94ª for the inner end of the cylinder, and when the carriage reaches the limit of its return movement the tappet projection 106 strikes the arm 105, and thus moves the valve 100 to a position for cutting off the flow to either end of the cylinder.

The advance movement of the tool-carriage is limited by means of an adjustable stop-screw 115, mounted on the machine-bed adjacent to the chuck end of the drum 9 and adapted to be engaged by a stop-plate 116, fastened to the under side of the carriage base-plate 62 near one end thereof.

From the foregoing it is thought that the construction, operation, and many of the advantages of the herein-described turning-machine for carriage-axles will be readily understood by those skilled in the art without further description, and I will have it understood that changes in the form and proportion of parts and in the minor details of construction may be resorted to without departing from the spirit or sacrificing any of the advantages of the invention.

Having thus described the invention, what is claimed as new, and desired to be secured by Letters Patent, is—

1. In an axle-turning machine, a revoluble drum carrying a plurality of revoluble chuck-mandrels, a reciprocatory tool-carriage carrying a corresponding number of tool-holders, a turning mechanism for the drum having a normally-inactive gear connection therewith, a locking device normally engaging with the drum, and a common controlling-lever having separate operative connections respectively with the turning mechanism and locking device, to provide for simultaneously releasing the locking device and setting into action the inactive gear connection of the turning mechanism, substantially as set forth.

2. In an axle-turning machine, a revoluble drum carrying a plurality of revoluble chuck-mandrels, means for simultaneously rotating the several chuck-mandrels, a reciprocatory tool-carriage carrying a corresponding number of tool-holders, friction gear mechanism having a train of normally-inactive gears for rotating the drum, a locking device normally engaging with the drum, and a common controlling-lever having separate operative connections respectively with the friction mechanism and locking device, to provide for a simultaneous operation thereof, substantially as set forth.

3. In an axle-turning machine, the machine-bed having a stationary bearing-frame, a work-holding drum mounted for rotation in said bearing-frame and provided at one end with a gear-ring, a plurality of revoluble chuck-mandrels journaled in the drum, gear-wheels fitted on one end of said mandrels, a central drive-shaft carrying a pinion meshing with all of the gear-wheels for the mandrels, a friction gear mechanism having a train of normally-inactive gears, one of which meshes with the gear-ring of the drum, a locking device for the drum, a common controlling-lever for the friction gear mechanism, and said locking device, and a reciprocatory tool-carriage, substantially as set forth.

4. In an axle-turning machine, the machine-bed having a stationary bearing-frame, a revoluble work-holding drum mounted for rotation in said bearing-frame, a series of separate bearing sleeves or bushings inserted in opposite ends of the drum and projected inwardly concentric with the horizontal axis of the drum, revoluble tubular chuck-mandrels arranged longitudinally of the drum and journaled in said bearing-bushings, separate exterior work-holding chucks fitted on one end of the mandrels, means for rotating said mandrels independently of the drum, a reciprocatory tool-carriage carrying a plurality of tool-holders corresponding in number to the chuck-mandrels, and means for rotating said drum to successively bring the chuck-mandrels opposite the different tool-holders, substantially as specified.

5. In an axle-turning machine, the machine-bed, a work-holder supported at one end of the bed and carrying a plurality of revoluble chuck-mandrels for holding the axles, a reciprocatory tool-carriage mounted to slide upon the bed and having on the base thereof a pair of lower tool-holders arranged in a fixed position in the same horizontal plane and respectively carrying roughing and finishing tools, a supporting-bracket overhanging the vacant space between the lower fixed tool-holders, and an upper or third tool-holder mounted horizontally on said bracket, and lying in a vertical plane between the said lower holders, said upper or third holder carrying grooving or nicking tools, substantially as set forth.

6. In an axle-turning machine, the machine-bed, a work-holder supported at one end of the bed and carrying a plurality of revoluble chuck-mandrels, a reciprocatory tool-carriage carrying a pair of lower tool-holders arranged in a fixed position, a longitudinally-movable upper or third tool-holder supported in a plane above and between the lower holders, and means for normally projecting the axle-receiving end of the upper or third tool-holder to a point in advance of the corresponding ends of the lower holders, substantially as set forth.

7. In an axle-turning machine, the machine-bed having a bearing-frame, a work-holding drum mounted for rotation in said bearing-frame and provided with an annular series of spaced lock-notches, a plurality of independently-revoluble chuck-mandrels mounted for rotation in the drum, a vertically-movable locking-bolt supported beneath the bearing-frame and adapted to have one end engage successively in the lock-notches, means for normally retracting said bolt in one direction, a friction gear device having a gear connection with said drum, an operating-treadle having a connection with said locking-bolt and friction gear device for simultaneously actuating the same, and the tool-carriage carrying a plurality of tool-holders, substantially as specified.

8. In an axle-turning machine, the machine-bed having a bearing-frame, a work-holding drum mounted for rotation in said bearing-frame and provided at one end with a gear-ring, a plurality of chuck-mandrels mounted for independent rotation in the drum, the tool-carriage having a plurality of tool-holders, a drive-shaft mounted centrally in the drum and having a driving-gear connection with the several chuck-mandrels, a tubular clutch-shaft having a gear connection with the gear-ring of said drum, a friction clutch-pulley loosely mounted on said clutch-shaft and having a belt connection with said drive-shaft, a friction-clutch feathered on the clutch-shaft at one side of the clutch-pulley, an operating-rod arranged longitudinally within the clutch-shaft, and having a connection at one end with the friction-clutch, a locking device for securing the drum in different set positions, and a common treadle connection between said locking device and one end of the operating-rod for said friction-clutch, substantially as set forth.

9. In an axle-turning machine, the machine-bed, a work-holder supported on the bed and carrying a plurality of revoluble chuck-mandrels, a reciprocatory tool-carriage carrying a pair of lower tool-holders arranged in a fixed position in the same horizontal plane, and an upper or third tool-holder supported on the carriage and capable of swinging in a lateral direction, substantially as set forth.

10. In an axle-turning machine, the machine-bed, a work-holder supported at one end of the bed and carrying a plurality of revoluble chuck-mandrels, a reciprocatory feed-carriage mounted to slide upon the bed and carrying a pair of lower tool-holders arranged in a fixed position in the same horizontal plane, a laterally-movable bracket-arm supported on the carriage in a plane above and between the lower tool-holders, and the upper or third tool-holder mounted on said bracket-arm, substantially as specified.

11. In an axle-turning machine, the machine-bed, a work-holder supported at one end of the bed and carrying a plurality of revoluble chuck-mandrels, a reciprocatory feed-carriage mounted to slide upon the bed and carrying a pair of lower tool-holders arranged in a fixed position in the same transverse horizontal plane, a laterally-movable bracket-arm having a pivotal support on the tool-carriage and lying in a plane above and between the lower tool-holders, a locking device to prevent said bracket-arm from swinging on its pivotal support, and the upper or third tool-holder mounted on said bracket-arm, substantially as specified.

12. In an axle-turning machine, the machine-bed, a work-holder supported at one end of the bed and carrying a plurality of revoluble chuck-mandrels, a reciprocatory feed-carriage carrying a pair of lower tool-holders arranged in a fixed position in the same transverse horizontal plane, an upper or third tool-holder slidably supported in a plane above and between the lower tool-holders, and a cushion arranged at one end of the sliding tool-holder and normally projecting the axle-receiving end thereof to a point in advance of the corresponding end of the lower holders, substantially as specified.

13. In an axle-turning machine, the machine-bed, a work-holder supported at one end of the bed and carrying a plurality of revoluble chuck-mandrels, a reciprocatory tool-carriage carrying a pair of fixed lower tool-holders arranged in the same transverse horizontal plane, a bracket-arm supported on the carriage in a plane above and between the lower tool-holders, an upper or third tool-holder mounted to slide longitudinally of said bracket-arm and having a guide-rod or bolt extended from one end thereof and working through a guide-opening of the bracket, and a spring coiled on said rod or bolt and normally projecting the upper holder to a point in advance of the axle-receiving ends of the lower holders, substantially as specified.

14. In an axle-turning machine, the machine-bed, a work-holder supported at one end of the bed and carrying a plurality of revoluble chuck-mandrels, a reciprocatory tool-carriage carrying a pair of fixed lower tool-holders respectively having roughing and finishing tools, an upper or third tool-holder supported in a plane above and between the lower tool-holders, and essentially comprising a cylindrical boxing having a horizontally-extended supporting-base, a laterally-adjustable tool-supporting plate slidably mounted on said supporting-base, and provided in its upper side with a longitudinal T-groove, an adjusting or feed screw connection with said tool-supporting plate, and separate tool-carrying posts adjustably fitted in the T-groove of said supporting-plate, substantially as specified.

15. In an axle-turning machine, the combination of the machine-bed, the work-holder for the axles, a reciprocatory tool-carriage mounted on the machine-bed, means for rapidly feeding the tool-carriage toward the work-holder by hydraulic pressure, separate means for controlling said hydraulic pressure to provide for checking the feed of the carriage at the point where the axles are ready to enter the tool-holders, then causing a second rapid movement of the carriage to the point where the tools begin to cut, and automatically stopping the same at such point, and auxiliary means for slowly completing the feed during the cutting of the tool, substantially as specified.

16. In an axle-turning machine, the combination of the machine-bed, the work-holder for the axles, a reciprocatory tool-carriage carrying tool-holders and mounted to slide on the bed, a hydraulic feed mechanism having a piston-rod connection with the tool-carriage and a controlling-valve for causing movement of the piston in either direction, a controlling-lever having a connection with said controlling-valve, and an adjusting-pin, a pair of spaced cam-plates arranged one in advance of the other on the tool-carriage and adapted to move against said pin to provide for the automatic elevation of the controlling-lever and the consequent closing of said controlling-valve, and separate means for slowly operating said hydraulic feed mechanism, substantially as specified.

17. In an axle-turning machine, the combination of the machine-bed, the work-holder for the axles, a reciprocatory tool-carriage carrying tool-holders, and a tappet projection at one end, an adjustable stop to limit the advance movement of the carriage, a hydraulic feed mechanism having a piston-rod connection with the carriage, and a controlling-valve for causing movement of the piston in either direction, a rock-shaft having a connection with said controlling-valve, and a pendent strike-arm, a controlling-lever connected with said rock-shaft, and provided with a laterally-projecting pin, a pair of spaced triangular cam-plates arranged one in advance of the other on the tool-carriage, and designed to operate against said pin, one of said cam-plates being shorter in height than the other, and separate means for slowly operating the hydraulic feed mechanism, substantially as specified.

18. In an axle-turning machine, the combination with the work-holder carrying chucks, of a horizontal laterally-swinging gage-arm pivotally supported above the work-holder and provided at one end with a vertically-disposed supporting member projected beyond the chucks and carrying an adjustable gage-plate provided at one edge with an axle-receiving notch, substantially as set forth.

19. In an axle-turning machine, the combination with the work-holder carrying chucks, of an attaching-bar secured on top of the support for the work-holder and provided at one end with a horizontally-arranged U-shaped keeper carrying an adjustable stop-screw, a laterally-swinging gage-carrying arm pivotally connected at one end with said bar and provided with a vertically-disposed supporting member at its other end, and a vertically-disposed gage-plate adjustably secured to said supporting member and provided at one side edge with an axle-receiving notch, substantially as specified.

In testimony that I claim the foregoing as my own I have hereto affixed my signature in the presence of two witnesses.

RALPH REED SPEARS.

Witnesses:
    THEODORE SCHULTZE,
    CHAS. F. SCHULTZE.